June 23, 1964 P. W. COVERT 3,138,753

MAGNETIC AMPLIFIER WITH SHUNT RESET CIRCUIT

Filed March 24, 1961

INVENTOR
PAUL W. COVERT

BY Shanley & O'Neil

ATTORNEYS

United States Patent Office 3,138,753

Patented June 23, 1964

3,138,753
MAGNETIC AMPLIFIER WITH SHUNT RESET CIRCUIT

Paul W. Covert, Butler, Pa., assignor to Magnetics, Inc., a corporation of Pennsylvania Filed Mar. 24, 1961, Ser. No. 98,149
7 Claims. (Cl. 323—89)

The invention relates generally to magnetic control circuitry and more particularly to magnetic amplifiers.

The advantages of modern magnetic amplifiers in the automatic-control field are well known in the art. Their limitations are becoming known. Many such magnetic amplifiers developed as modifications of the saturable reactor and tied the gain available to a limiting relationship between the control ampere turns and the load ampere turns. All are bound by an interrelation of the time of response of the amplifier and the power gain; the higher the gain, the longer the time of response. It is the aim of the present invention to avoid such limitations while employing a flux-level reset method of magnetic amplifier control.

The reset method of the invention employs alternating current, periodic with the power source frequency, to control the magnetic amplifier. Direct current or other sources may still be used for bias, etc., however the controlling current is periodic with the power source. Generally this method of control calls for a blocking rectifier in a winding circuit during a control half cycle. It has been found that this imposes many limitations in design by requiring matching of the rectifyng device to the reactor of the circuit.

One method of accomplishing flux reset in a core is to leak current by the blocking rectifier during a control half cycle. This may be accomplished with a controllable impedance device. Again it has been found that this imposes many limitations on a circuit since the controllable impedance device must be able to withstand the high reverse voltage across the blocking rectifier during a control half cycle. Since the controllable impedance device absorbs power from the circuit, it will be apparent that the greater the voltage appearing across it, the greater the power loss. One object of the invention is to provide magnetic amplifier control with lower power loss.

It is the general objective of this invention to provide an advanced scheme for reset control which to a large extent eliminates the element matching limitations presented above while providing a magnetic amplifier of greatly increased power gain without increasing the response time of the magnetic amplifier.

Figure 3:
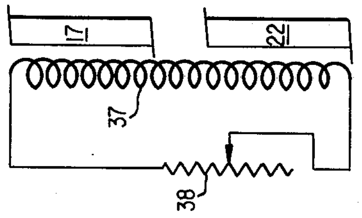

The exact nature of the invention and other contributions to the art made by the invention will become more apparent from the detailed discussion to follow. During such discussion reference will be had to the accompanying drawings, in which FIGURE 1 is a schematic diagram of apparatus embodying the invention, FIGURE 2 is a circuit diagram of a specific embodiment of the invention, FIGURE 3 is a schematic diagram of a portion of apparatus embodying the invention; and FIGURE 4 is a graphical representation of transfer characteristics of a specific embodiment of the invention.

Figures 1, 2, 4:
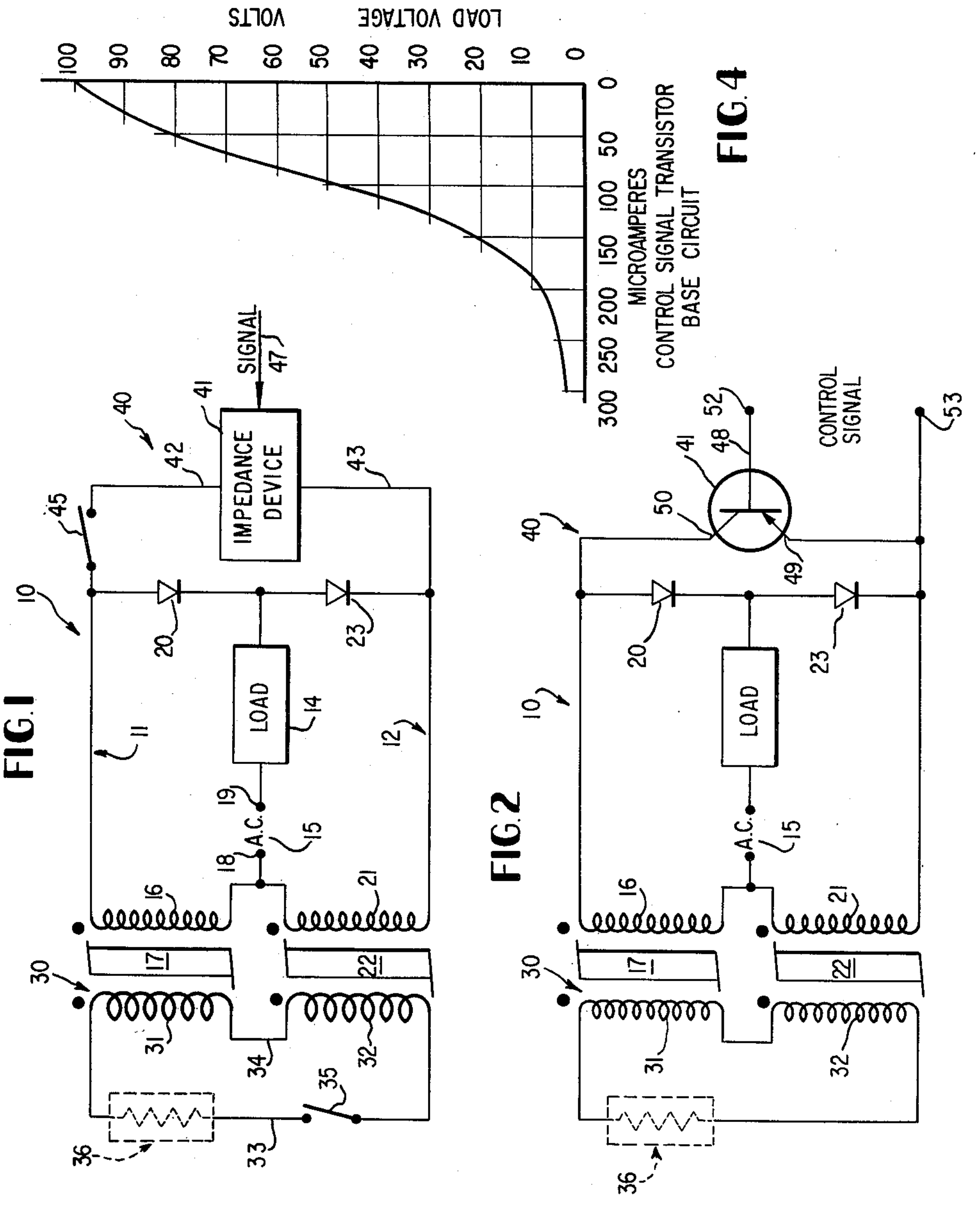

Referring to FIGURE 1, reactor-rectifier circuit 10 is a full wave circuit with two half wave circuit arms 11 and 12 working into a common load 14 and powered by a common A.C. source 15. Circuit arm 11 includes coil 16, wound on saturable core 17, and rectifier 20. Circuit arm 12 includes coil 21, wound on saturable core 22, and rectifier 23.

Cores 17 and 22 are magnetically coupled by circuit 30 including windings 31 and 32 connected together by leads 33 and 34; lead 33 including switch 35. Resistor 36, shown in dotted lines, represents the resistance of the circuit. It should be noted that circuit 30 is a closed circuit, that is without separate power supply.

A reset circuit 40 shunts rectifiers 20 and 23, and includes control device 41, leads 42 and 43, and switch 45. A signal source 47 may gate impedance device 41.

Consider the operation of reactor-rectifier circuit 10 with coupling circuit 30 and reset circuit 40 inoperative (switches 35 and 45 open). Assume a half cycle of the A.C. source in which rectifier 20 allows current in circuit arm 11 and rectifier 23 blocks current in circuit arm 12. Circuit arm 11 can be said to be in its conducting or load half cycle and circuit arm 12 is in its non-conducting half cycle; the conducting status of each arm will alternate with alternations of the A.C. source 11. In the load half cycle of circuit arm 11 prior to saturation of core 17, practically all the voltage drop in the circuit arm appears across coil 16. Except for the magnetization current of core 17 there is no current in circuit arm 11. When core 17 saturates the impedance of coil 16 diminishes to its pure resistive value and there is load current in circuit arm 11.

During the load half cycle of circuit arm 11, rectifier 23 blocks, there is no current through coil 21, and the flux level in core 22 remains at the level (determined by its residual magnetism) to which it had returned after the previous half cycle when circuit arm 12 was conducting.

However, closing switch 45 connects reset circuit 40 across rectifier 23 and a leakage current path exists for coil 21. The reset current path is from A.C. source 15, through coil 21, lead 43, control device 41 (if gated open), lead 42, switch 45, rectifier 20 and load 14, returning to the A.C. source to complete the circuit. Circuit arm 12 can now be said to be in its control half cycle; coil 21 is acting as the control coil and coil 16 as the load coil.

Reset current in coil 21 will be determined by the control device 41, and this in turn determines the flux excursion which resets core 22. During the subsequent half cycle, when rectifier 23 is in the forward direction, no load current will flow in circuit arm 12 until the flux excursion of core 22, from the reset level to saturation, is complete. In this way the flux reset level during the control half cycle determines the firing angle during the subsequent load half cycle.

In the half cycle when rectifier 20 is blocking, the flux-reset current path is from A.C. source 15 through load 14, rectifier 23, lead 43, control device 41 (if gated open), lead 42, switch 45, and coil 16, returning to the A.C. source to complete the circuit. The flux-reset current is again determined by the control device 41 and the flux level in core 17 is set thereby as well as the subsequent firing angle. Coils 16 and 21 are alternately load and control coils with alternations of the A.C. source 15 and the power delivered to load 14 is determined by the impedance of control device 41.

In the operations just discussed switch 35 of the coupling circuit 30 was considered open. Without coupling circuit 30, the full voltage of source appears across the blocking rectifier and the control device 41. That is, one or the other of the rectifiers 20 or 23 is blocking during a half cycle and the full voltage of the source appears across the reset circuit 40 which is shunting the blocking rectifier. As mentioned earlier, this limits the selection of a control device. It must be a device which can withstand the full voltage of the A.C. power source.

Consider the operation of the circuit with switch 35 closed. Cores 17 and 22 are coupled by circuit 30 which is a high-reactance, low resistance circuit. The combined resistance 36 of coils 31 and 32 and leads 33 and 34 is small and there is a very small IR drop in the coupling circuit. Assume a half cycle of the A.C. source in which coil 16 is the load coil and terminal 18 is positive and terminal 19 is negative. Coils 16 and 31 are wound in the same direction as are coils 32 and 21 as indicated by the dots. Coil 16 acts as a primary winding and coil 31 as a secondary winding. Coil 16 has practically all the supply voltage across it with the dot end negative before the core fires. Coil 31 will have almost the same voltage induced in it with the dot end negative. The voltage of coil 31 will in turn be impressed on coil 32 with the dot end positive inducing almost the same voltage in coil 21 with the dot end positive. The difference between the voltage in coil 16 and that induced in coil 21 is a slight coupling loss, equal to core magnetizing current times winding resistance, and may be about 3% to 5% of the supply voltage. This difference may be varied by changing the resistance of circuit 30.

The voltage induced in coil 21 bucks the voltage in circuit arm 12 from the source 15 and the voltage level in circuit arm 12 (during its control half cycle) has a maximum value equal to the line voltage diminished by the bucking voltage. Now rectifier 23 need block only a small percentage of the line voltage; as low as 5% to 7%, dependent on the reactance and resistance values of coupling circuit 30; control device 41 is protected from high line voltages and therefore many devices previously not suitable to power applications are available to a circuit designer.

In addition to the greater selection of control devices which can be had, the reverse-voltage rating of the rectifiers can be much lower, therefore poorer performance rectifiers can be used with resulting economic advantage.

Also, a low voltage control device can be selected, the power loss of the control circuit held low, and the power gain of the amplifier increased. The power gain is not obtained at the expense of response time as in conventional magnetic amplifiers.

FIGURE 2 shows a specific embodiment in which the control device 41 takes the form of a transistor having a base 48, with its emitter 49 and collector 50 connected across the rectifiers 20 and 23. A control signal for transistor 41 is supplied through terminals 52 and 53. It should be noted that no bias or power supply is necessary for the transistor in this circuit and also that a low-voltage rating transistor can be used in a high-voltage circuit application.

The ability to use transistors in power circuit applications is an especially important feature of the invention. An important advantage is combination of transistor gain and the magnetic gain. The resulting magnetic amplifier has tremendous power gain; with the circuit values immediately following a power gain of 900,000 is obtained. Circuit values:

| | |
|---|---|
| Cores **17** and **22** | 0.12 inch silicon steel, dimensions $2\frac{3}{4}$ x $4\frac{9}{16}$ x $1\frac{1}{4}$, cores annealed to have a minimum $B_r/B_m$ of 80% wherein $B_r$=the rententive flux density and $B_m$=the peak flux density. |
| Windings **16** and **21** | 380 turns of #13 wire. |
| Windings **31** and **32** | 400 turns of #28 wire. |
| Resistance of coupling circuit **30** | 500 ohms. |
| $N_c^2/R_c$ Wherein $N_c$=the number of turns of windings **31** or **32** and $R_c$ is the resistance of the coupling circuit **30** | 320. |
| Diodes **20** and **23** | Rated 5 amps. half-wave, 50 volts peak inverse voltage. |
| Transistor **41** | 2N652 germanium, PNP, 30 volt rating, current gain 100 minimum. |
| A.C. source **15** | 120 volts 60 cps. |
| Load **14** | 13 ohms—1000 watts. |

This circuit would be rated a 750 VA amplifier. The recurrent blocking voltage on the diodes 20 and 23 would be approximately 20 volts.

FIGURE 4 is a representation of the transfer characteristics of the magnetic amplifier just described in which load voltage versus control signal is plotted. This graph brings out another advantage of the present invention that is the elimination of faulty triggering experienced with most magnetic amplifiers near cutoff. It can be seen from the curve of FIGURE 4 that as the control signal increases the load voltage decreases. The larger the signal into the transistor the lower its resistance and the power gain of the magnetic amplifier degenerates near cutoff. Because of the degeneration of the power gain near cutoff the instability experienced at the bottom knee of transfer curves of conventional magnetic amplifiers is eliminated and the faulty triggering of such magnetic amplifiers is not experienced with magnetic amplifiers embodying the invention.

In the coupling circuit of FIGURE 3 a rheostat 38 is included for controlling coupling loss occurring in this circuit and in turn the bucking voltage induced in a circuit arm of the magnetic amplifier during its control half cycle. Rheostat 38 permits selection of a voltage level for control of the magnetic amplifier and adaptation of various transistors, or other control devices, and rectifiers to a particular circuit. From the earlier description it can be seen that this may also be accomplished by selection of the reactance and resistance values for the elements of the coupling circuit. The coupling circuit of FIGURE 3 also includes windings 37 common to both cores which performs the same function as the separate winding described earlier. Also cores 17 and 22 need not be physically separate cores, only separate magnetic paths; they can be two magnetically saturable closed loops sharing a common leg in a three legged core device.

In disclosing the invention, unique methods of magnetic amplifier control and novel magnetic control circuitry have been described. Many modifications and variations of these are possible in the light of the teachings included herein. It is therefore to be understood, that within the scope of the appended claims, the invention may be practiced otherwise than as specifically described.

I claim:

1. A leakage reset magnetic amplifier circuit comprising reactor-rectifier circuit means including a pair of saturable cores and a pair of circuit arms, each circuit arm including a first winding means which is wound on one of the saturable cores and connected in series with a rectifier means, means for connecting the reactor-rectifier circuit means to an A.C. source and load means so that each circuit arm conducts load current in alternate half cycles of the A.C. source, semi-conductor means shunting each rectifier means to provide a current path for resetting flux level in each saturable core during the non-conductive half cycle of each rectifier means, and closed circuit means including second winding means magnetically coupling both saturable cores to induce a bucking voltage in the first winding means during flux level reset of the saturable core linked by such first winding means.

2. In a leakage reset magnetic amplifier reactor-rectifier circuit means including a pair of saturable magnetic paths, reactor winding means for each saturable magnetic path, and rectifier means in series with the reactor winding means, permitting current in only one direction through the series-connected reactor winding means, means for connecting the reactor-rectifier circuit means to an A.C. source and load means, reset circuit means including controllable impedance means connected to the reactor winding means in shunt to the rectifier means, and closed circuit means including winding means connected to magnetically couple the pair of saturable magnetic paths, limiting voltage level in the reset circuit means.

3. A leakage reset magnetic amplifier comprising reactor-rectifier circuit means including a pair of saturable magnetic paths, reactor winding means for each magnetic path, and rectifier means connected in series with each reactor winding means, means for connecting the reactor-rectifier circuit means to an A.C. source and load means, flux reset circuit means shunting the rectifier means including a signal responsive means for gating reset current, and closed circuit means including windings magnetically coupling both saturable magnetic paths to limit reset current voltage.

4. A leakage reset magnetic amplifier comprising core structure defining a pair of saturable magnetic paths, reactor winding means magnetically coupled to each saturable magnetic path, rectifier means connected in series with each reactor winding means, means for connecting the reactor winding and rectifier means to an A.C. source and to load means, control circuit means shunting the rectifier means, and closed circuit means for limiting voltage level in the control circuit means, the closed circuit means including windings magnetically coupling the pair of saturable magnetic paths without significant coupling losses.

5. A leakage reset magnetic amplifier comprising reactor-rectifier circuit means including saturable core means and a pair of parallel-connected circuit arms, each circuit arm including a saturable core winding and rectifier means connected in series, the rectifier means connected to permit current in only one direction through each circuit arm, means for connecting the reactor-rectifier circuit means to an A.C. source and load means, flux reset circuit means including a transistor amplifier device connected in shunt relationship with both rectifier means for establishing a current path through each circuit arm in an opposite direction to that permitted by each rectifier means, and closed circuit means magnetically coupling the saturable core means of the reactor-rectifier circuit means limiting voltage level in the reset circuit means.

6. In combination a pair of saturable magnetic paths, an A.C. power source, a load means, a pair of circuit arms connected to the A.C. power source and the load means to control load current during alternate half cycles of the A.C. power source, each circuit arm including reactor winding means in series with a rectifier means, the rectifier means connected to establish load current in one direction only through each circuit arm, reset circuit means including a controllable impedance connected in parallel with the rectifier means to permit reset current in each circuit arm in an opposite direction to that established for load current by the rectifier means, and closed circuit means including winding means magnetically coupling both saturable magnetic paths in tight flux relationship to limit reset current voltage level.

7. High-gain magnetic amplifier circuit comprising a pair of saturable magnetic paths, an A.C. power source, a load means, a pair of circuit arms connected to the A.C. power source and the load means, each circuit arm including reactor windings and rectifier means connected in series with the reactor windings being magnetically coupled to one of the saturable magnetic paths and the rectifier means being connected to permit unidirectional load current in each circuit arm during alternate half cycles of the A.C. power source, flux reset circuit means including a transistor amplifier device shunting the rectifier means, permitting reset current in each circuit arm during non-conducting half cycles of the rectifier means, and closed circuit means including winding means magnetically coupling both saturable magnetic paths in tight flux relationship to limit reset current voltage level.

References Cited in the file of this patent

UNITED STATES PATENTS

| | | |
|---|---|---|
| 2,275,308 | Niemann | Mar. 3, 1942 |
| 2,770,770 | Lufcy | Nov. 13, 1956 |
| 2,783,315 | Ramey | Feb. 26, 1957 |
| 2,807,776 | Buechler et al. | Sept. 24, 1957 |
| 2,855,560 | Sanders | Oct. 7, 1958 |
| 2,902,547 | Rowley et al. | Sept. 1, 1959 |